US008787620B2

(12) United States Patent
Laurence et al.

(10) Patent No.: US 8,787,620 B2
(45) Date of Patent: Jul. 22, 2014

(54) AUTOMATED CRYSTAL IDENTIFICATION ACHIEVED VIA WATERSHED SEGMENTATION

(71) Applicant: Koninklijke Philips N.V., Eindhoven (NL)

(72) Inventors: Thomas Laurence, North Royalton, OH (US); Sharon X. Wang, Highland Heights, OH (US); Jerome J. Griesmer, Mentor, OH (US); Thomas Blaffert, Hamburg (DE); Zhiqiang Hu, Twinsburg, OH (US); Steffen Renisch, Hamburg (DE)

(73) Assignee: Koninklijke Philps N.V., Eindhoven (NL)

( * ) Notice: Subject to any disclaimer, the term of this patent is extended or adjusted under 35 U.S.C. 154(b) by 0 days.

(21) Appl. No.: 13/955,029

(22) Filed: Jul. 31, 2013

(65) Prior Publication Data

US 2013/0315454 A1    Nov. 28, 2013

Related U.S. Application Data

(63) Continuation-in-part of application No. 13/702,150, filed as application No. PCT/IB2011/051837 on Apr. 27, 2011.

(60) Provisional application No. 61/354,912, filed on Jun. 15, 2010.

(51) Int. Cl.
*G06K 9/00*    (2006.01)
*G01V 5/12*    (2006.01)

(52) U.S. Cl.
USPC ............... 382/103; 382/278; 250/269.3

(58) Field of Classification Search
USPC ......... 382/100, 103, 106–107, 128–134, 154, 382/162, 168, 173, 181, 232, 254, 274, 276, 382/286, 299, 305, 312; 378/4, 8, 21; 250/363.9, 363.3, 363, 252.1, 269.3, 250/362
See application file for complete search history.

(56) References Cited

U.S. PATENT DOCUMENTS

| 5,444,253 A | 8/1995 | Berlad |
| 6,288,399 B1 | 9/2001 | Andreaco et al. |
| 6,710,349 B2 * | 3/2004 | Shao ........................ 250/363.03 |

(Continued)

OTHER PUBLICATIONS

Chaudhari, A. J., et al.; Crystal identification in positron emission tomography using nonrigid registration to a Fourier-based template; 2008; Phys. Med. Biol.; 53:5011-5027.

(Continued)

*Primary Examiner* — Seyed Azarian (57) ABSTRACT

A nuclear imaging system includes a crystal identification system which receives a flood image which includes a plurality of peaks, each peak responsive to radiation detected by a corresponding scintillator crystal. A crystal identification processor partitions the flood image into a plurality of candidate regions with a watershed segmentator implementing a watershed algorithm. The candidate regions are linked in an adjacency graph, and then classified as background or relevant, where relevant regions contain a peak within the watershed lines. The regions are then assigned to a crystal according to an objective function and an assignability score. A calibration processor maps the peaks to a rectangular grid.

17 Claims, 9 Drawing Sheets

(56) References Cited

U.S. PATENT DOCUMENTS

| | | | |
|---|---|---|---|
| 7,232,990 B2 * | 6/2007 | Wang et al. | 250/252.1 |
| 7,335,889 B2 | 2/2008 | Wang et al. | |
| 7,368,721 B2 | 5/2008 | Wang et al. | |
| 7,449,680 B2 | 11/2008 | Wang et al. | |
| 7,953,265 B2 * | 5/2011 | Sirohey et al. | 382/131 |
| 2005/0061983 A1 | 3/2005 | Stonger et al. | |
| 2006/0011847 A1 * | 1/2006 | Wang et al. | 250/363.09 |
| 2008/0050000 A1 * | 2/2008 | Blaffert et al. | 382/131 |
| 2010/0038546 A1 * | 2/2010 | Schulz | 250/362 |

OTHER PUBLICATIONS

Chaudhari, A. J., et al.; Spatial distortion correction and crystal identification for positron-sensitive avalanche photodiode-based PET scanners; 2008; IEEE Nuclear Science Symposium Conference; pp. 5045-5052.

Park, S. K., et al.; A software package for the semi-automated crystal identification and spectrum analysis in multi-layer DOI PET systems; 2009; J. Nucl. Med.; 50 (Supplement 2)1537.

Stonger, K. A., et al.; Optimal Calibration of PET Crystal Position Maps Using Gaussian Mixture Models; 2004; IEEE Trans. on Nuclear Science; 51(1)85-90.

\* cited by examiner

AUTOMATED CRYSTAL IDENTIFICATION ACHIEVED VIA WATERSHED SEGMENTATION

This is a continuation-in-part application of U.S. application Ser. No. 13/702,150; filed Dec. 5, 2012 which is a US National Stage Entry of PCT Application No. PCT/IB2011/051837 filed Apr. 27, 2011 which claims the benefit of U.S. provisional application Ser. No. 61/354,912 filed Jun. 15, 2010, all of which are incorporated herein by reference.

The present application relates to nuclear imaging systems. It finds particular application in conjunction with positron emission tomography (PET) detectors, more particularly, the calibration of pixelated scintillators with solid-state sensors. Photons from positron-electron annihilation events are detected and localized. Image intensity is related to the concentration of an injected radioactive pharmaceutical at body locations.

In positron emission tomography (PET), the radioactive decay events of the radiopharmaceutical produce positrons. Each positron interacts with an electron to produce a positron-electron annihilation event that emits two oppositely directed gamma rays. Using coincidence detection circuitry, a ring array of radiation detectors surrounding the imaging patient detect the coincident oppositely directed gamma ray events corresponding to the positron-electron annihilation. A line of response (LOR) connecting the two coincident detections contains the position of the positron-electron annihilation event. Such lines of response are analogous to projection data and can be reconstructed to produce a two- or three-dimensional image. In time-of-flight PET (TOF-PET), the small time difference between the detection of the two coincident gamma ray events is used to localize the annihilation event along the LOR (line of response).

Modern PET imaging systems include a scintillator layer and an array of photomultiplier tubes (PMTs) with an optical coupling layer disposed therebetween. Gamma ray events interact with the scintillation layer, which in turn produces a scintillation of a flash which produces a plurality of light photons. The photons from the scintillation crystal are detected by the PMTs, which output signals proportional to the energy of the incident gamma ray. Anger logic is used to analyze the output signals to determine the location of each scintillation on the scintillation layer. In general, each scintillation event is detected by more than one PMT. Based on the relative amplitude of the scintillation photons, the coordinates of each scintillation event are determined.

To improve resolution of PET imaging systems, pixelated scintillators have been introduced which include an array of optically isolated scintillator crystals. A detector ring is approximately 90 cm in diameter and 15-25 cm wide. Instead of a few to several large block scintillators affixed to one another to form the interior layer of the detector ring, a pixelated scintillator is made of thousands of tightly packed scintillator crystals which measure approximately $2\times2$ mm$^2$ to $4\times4$ mm$^2$. Each scintillator crystal is optically isolated from one another by a thin reflector sheet to reduce cross talk between adjacent pixels. Anger logic is still employed with pixelated scintillators to determine the coordinates of scintillation events. However, since Anger logic relies on a single scintillation event being detected by multiple detectors to localize a radiation event, geometric distortions are introduced towards the edges, known as edge compression, because the number of detectors available at the edges is limited. Generally, detection at the center of the detector ring is much more accurate than towards the edges.

For accurate image reconstruction, attributes such as energy resolution, timing resolution, light collection, or the like need to be measured for each crystal because individual crystals can have varying characteristics in addition to variations between detectors. These variations result in irregularities between the calculated radiation event and the exact position where the scintillation event occurred. The measured attributes are used to calibrate the system to ensure optimal spatial resolution and sensitivity.

Current calibration techniques involve irradiating the detector array with an annihilation flood source to generate a flood image. The flood image is a two-dimensional distribution of the detected events, where each peak corresponds to a single crystal in the pixelated scintillator. For non-pixelated systems, or block detector systems, a pin-hole mask is used to cover the scintillator blocks to generate the 2-D distribution of detected events. A calibration map is generated from the flood image to map the position of calculated radiation events to the actual position of the corresponding scintillator crystal. The calibration map is used to remove any geometric distortions in acquired image data. Generating the calibration map currently relies heavily on manual intervention, which can take up to eight hours for a skilled technician to complete. Thus, there exists a need for an automated method and corresponding system to reduce the calibration time of nuclear imaging systems.

The present application provides a new and improved crystal identification system and method which overcomes the above-referenced problems and others.

In accordance with one preferred method of the present application, a method for crystal identification in nuclear imaging systems is provided, the method comprising: generating a flood image which comprises an intensity distribution with distinct peaks, where each peak is a response to received radiation, and each peak corresponding to a scintillator crystal; identifying candidate regions using a watershed transform; and assigning a crystal for each candidate region. Since crystals are arranged on a rectangular grid, they are uniquely identified by an integer x/y coordinate.

In accordance with one preferred embodiment of the present application, a crystal identification system is provided, the system comprising: an image memory which receives a flood image which includes an intensity distribution with distinct peaks, e.g. local maxima, with each peak responsive to radiation detected by a corresponding scintillator crystal; a crystal identification processor configured to: identify candidate regions using a watershed transform; and assign a crystal for each candidate region.

In accordance with another embodiment of the present application, an apparatus for crystal identification in nuclear imaging systems is provided, the method comprising: generating a flood image; segmenting the flood image into candidate regions around distinct peaks using a watershed algorithm; generating an adjacency graph representing the candidate regions; labeling each peak region with an integer x/y coordinate of a crystal according to an assignability score and a defined optimality objective function; and mapping the locations of peak maxima within the image to a rectangular template by using the integer x/y crystal coordinate.

One advantage resides in that calibration time and cost are reduced.

Another advantage resides in that geometric distortions in nuclear imaging data are reduced.

Another advantage is that the method requires little or no manual intervention.

Still further advantages of the present invention will be appreciated to those of ordinary skill in the art upon reading and understand the following detailed description.

The invention may take form in various components and arrangements of components, and in various steps and arrangements of steps. The drawings are only for purposes of illustrating the preferred embodiments and are not to be construed as limiting the invention.

A watershed algorithm regards an image as a topographic relief, where the image values are interpreted as altitude in the relief. Generally a watershed algorithm defines watershed lines along "mountain crests" in the relief, i.e. along high image values. If the watershed algorithm is adapted to generate watershed lines along low image values, the watershed algorithm defines watershed lines along valleys in the relief. These watershed lines along low image values can be calculated by modifying a standard watershed algorithm accordingly or by applying a standard watershed algorithm to an inverted image having inverted image values.

A watershed algorithm is preferentially adapted to perform a standard watershed segmentation as disclosed in, for example, the article "Watersheds in Digital Spaces: An Efficient Algorithm Based on Immersion Simulations" by L. Vincent and P. Soille, IEEE Trans. Pattern Anal. Machine Intell., 13(6), 583-598 (1991). However, in another embodiment the watershed algorithm can also be adapted to generate watershed lines along low image values of the respective provided image for generating the segmented image.

Figure 1:
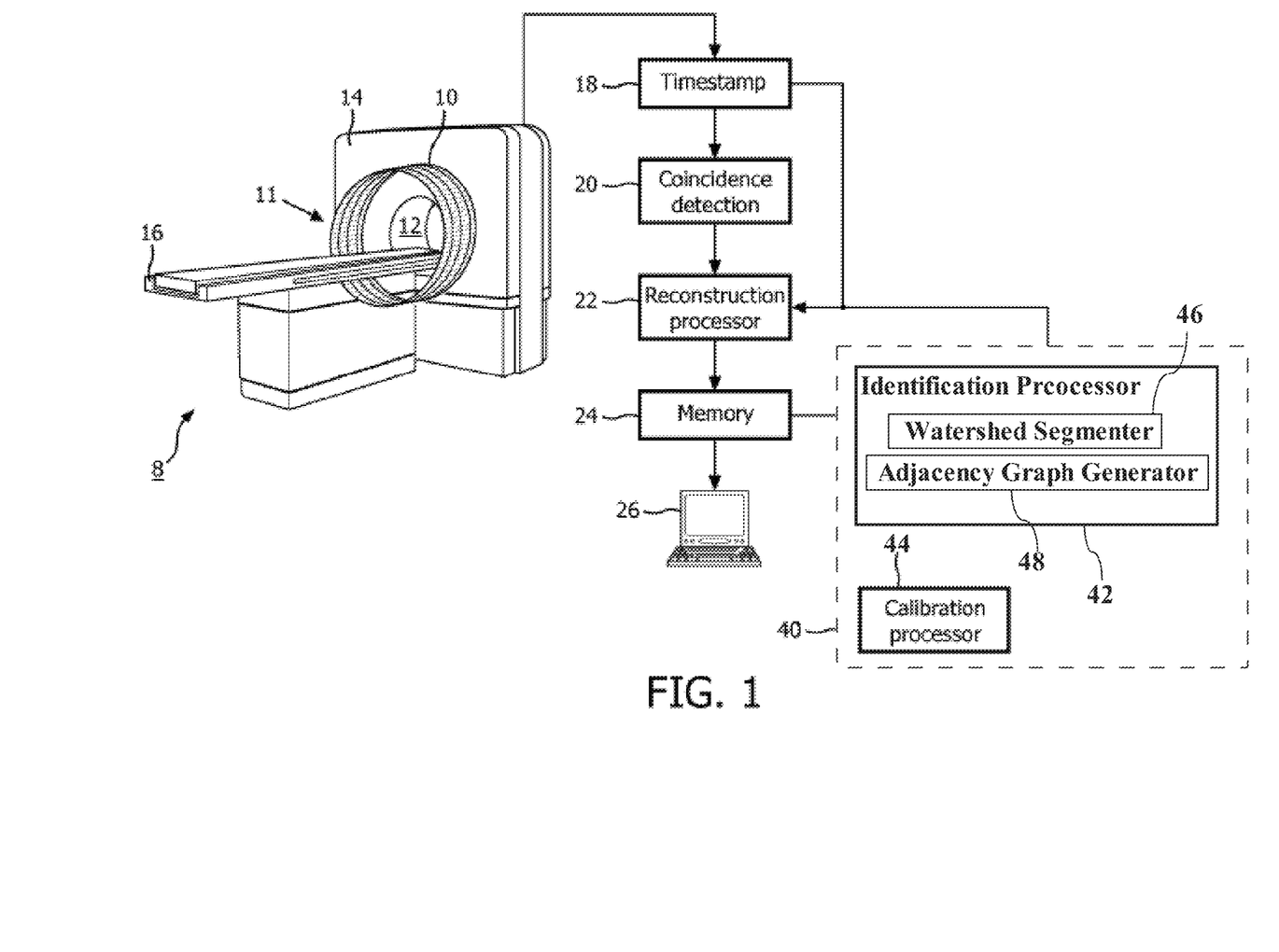
FIG. 1 diagrammatically illustrates a nuclear imaging system with a crystal identification system.

With reference to FIG. 1, a nuclear imaging system, such as a SPECT scanner, a PET scanner, or other radiation tomography scanner 8, includes a plurality of radiation detectors 10 oriented to receive radiation from an imaging region 12. The radiation detector modules 10 are arranged in several adjacent rings along an axial direction; however, other arrangements of radiation detector modules can be used.

Moreover, it is to be appreciated that the plurality of radiation detector modules 10 arranged in an array 11 is diagrammatically illustrated; typically the radiation detector array 11 is housed within a housing 14 of the tomography scanner 8 and thus are not visible from the outside. Each radiation detector module 10 includes a pixelated scintillator layer and a radiation detector, such as a photomultiplier tube (PMT) or the like, with an optical coupling layer disposed therebetween. The tomography scanner 8 includes a subject support 16 for positioning a subject or a human patient in the imaging region 12. Optionally, the support 16 is linearly movable in the axial direction generally transverse to the rings of the radiation detector modules 10 to facilitate acquisition of three-dimensional imaging data over an extended axial distance.

During an imaging procedure, a patient on the support 16 is injected with a radiopharmaceutical. Radiation events are detected by the radiation detector modules 10. A time stamp is associated with each sensed scintillation event by a time stamp circuit 18. In a PET scanner, a coincidence detector 20 determines coincident pairs and the LOR defined by each coincident pair. A reconstruction processor 22 reconstructs the LORs into an image representation which is stored in an image memory 24. In a TOF-PET system, the reconstruction processor also derives time-of-flight information for each LOR from the time-stamp circuit 18.

A graphic user interface or display device 26 includes a user input device which a clinician can use to select scanning sequences and protocols, display image data, and the like. The graphic user interface 26 accepts user input through a mouse, keyboard, touchscreen, display, microphone, data file, and the like. The graphic user interface 26 includes a display for displaying data to a user. The display is an LCD, TFT, LED, CRT or another screen implementation.

Due to inconsistencies between individual scintillator crystals and between individual PMTs, such as inaccuracies introduced during manufacturing, each PET imaging system is calibrated to account for geometric distortions which may arise from these inconsistencies. The results ensure that each calculated radiation event is associated to the scintillator crystal location at which the scintillation actually occurred. Furthermore, because of the nature of reconstruction algorithms, such as Anger logic or the like, used by the reconstruction processor 22, the distribution of detected radiation events at the edges of the radiation detector ring are highly compressed and vary largely from one detector module 10 to another. The PMTs tend to pull the apparent location of scintillation events towards the center of the PMT. Once the camera has been calibrated, the output signals from the PMTs will gradually change or drift over time and use. Eventually the drift will distort the output such that the system should again be re-calibrated. The initial calibration and regular re-calibrations can be time-consuming and costly to the consumer. An automatic crystal identification system can reduce the time of a skilled technician to perform a calibration procedure from eight to ten hours to less than one hour providing a significant cost savings in both labor and scanner down time.

Figure 2:
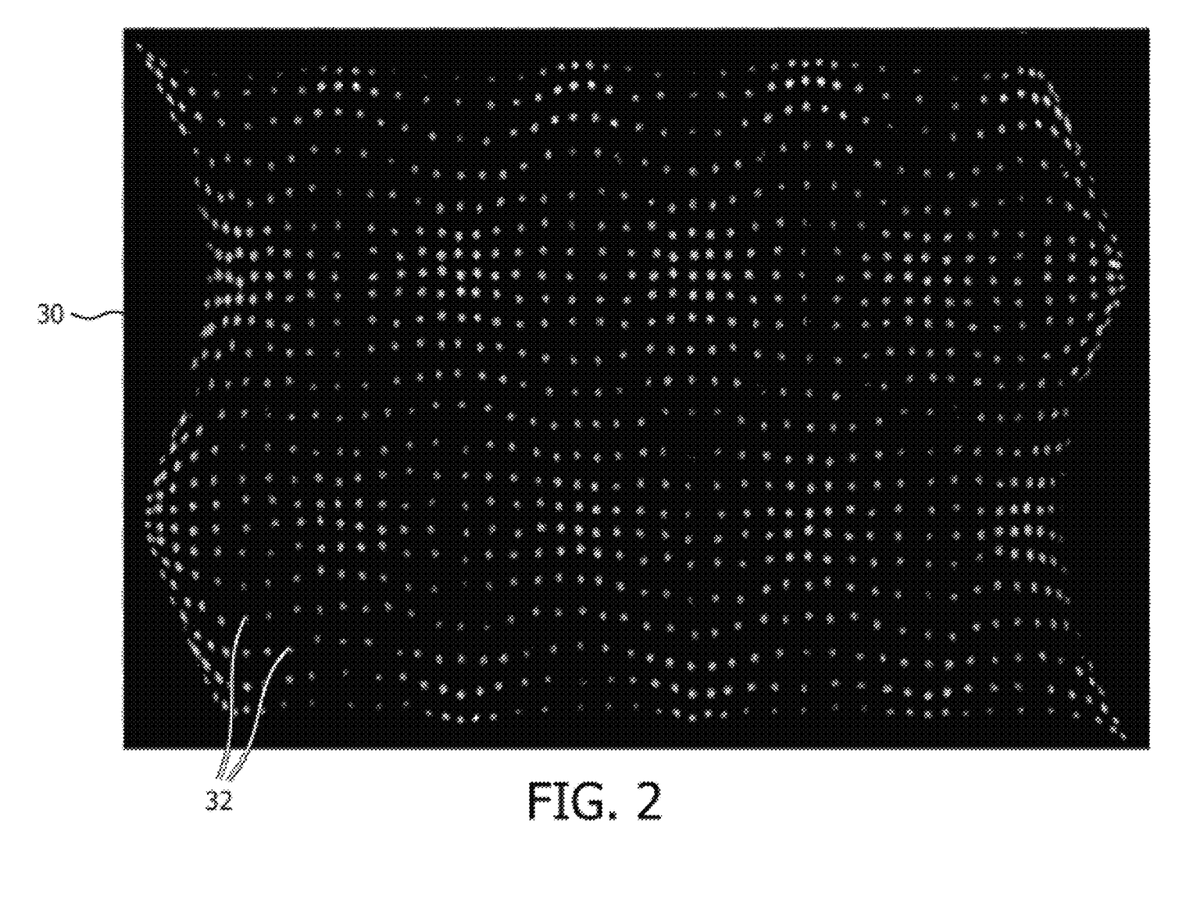
FIG. 2 illustrates a flood image.

To calibrate the PET scanner 8, a point or line source is placed into the imaging region such that the radiation detector modules 10 are uniformly flooded with radiation events. When the flood data is reconstruction, the result is a flood image 30, as illustrated in FIG. 2, which is a two-dimensional distribution of horizontal and vertical locations (i.e. rows and columns) of detected radiation events. Each scintillation peak 32 in the flood image 30 corresponds to an individual scintillator crystal in the pixelated scintillator. The generated flood image 30 is stored on an image memory 24 which is accessible by a crystal identification system 40 for further analysis. For scanners with a continuous or block rather than pixelated scintillator, a lead plate with a rectangular array of apertures is placed over each detector module. The square grid of scintillator crystals is distorted in the flood image 30.

The crystal identification system 40 includes an identification processor 42 or computer routine which processes the flood image 30 to identify and determine the image location corresponding to each individual scintillator crystal. A calibration processor 44 or computer routine corrects geometric distortions in acquired projection data based on the determined image locations of the scintillator crystals.

Figure 3:
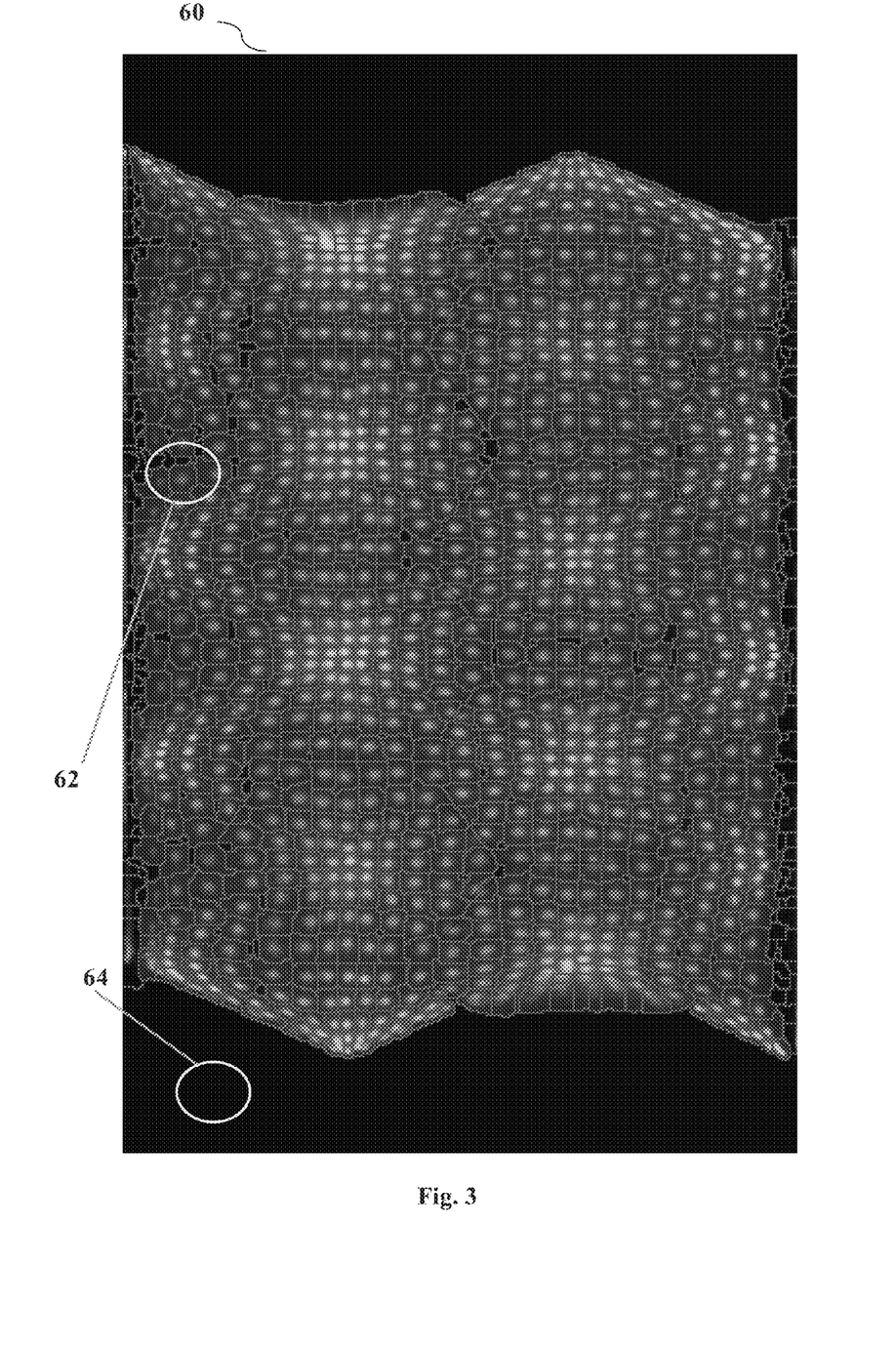
FIG. 3 illustrates an example of a segmented (tessellated) image after watershed transform.

The identification processor 42 performs a watershed segmentation of the flood image 30 using a watershed segmentator 46. The watershed segmentator 46 is configured to generate watershed lines along low image values of the image for generating the segmented image. The segmentation is preferentially performed by generating watershed lines along low image values, if the watershed segmentation is not applied to a gradient image, but to the non-differentiated provided image. This watershed segmentation based on lines along low image values improves the quality with which certain element classes are distinguished. With reference to FIG. 3, the watershed segmentator 46 forms many candidate regions where potentially relevant peaks 32 related to crystals are found. The watershed segmentator 46 generates as many candidate regions as local intensity maxima are found in the flood image 30. The watershed segmentator 46 includes representative candidate regions 62 & 64 and the edges link neighboring candidate regions that share a common watershed line for the entire flood image 30.

In one embodiment, prior to the watershed segmentation the flood image 30 may be smoothed in order to suppress noise structures in such a way that locally close peaks still remain local maxima. In order to achieve this, smoothing varies with peak density.

Figure 4:
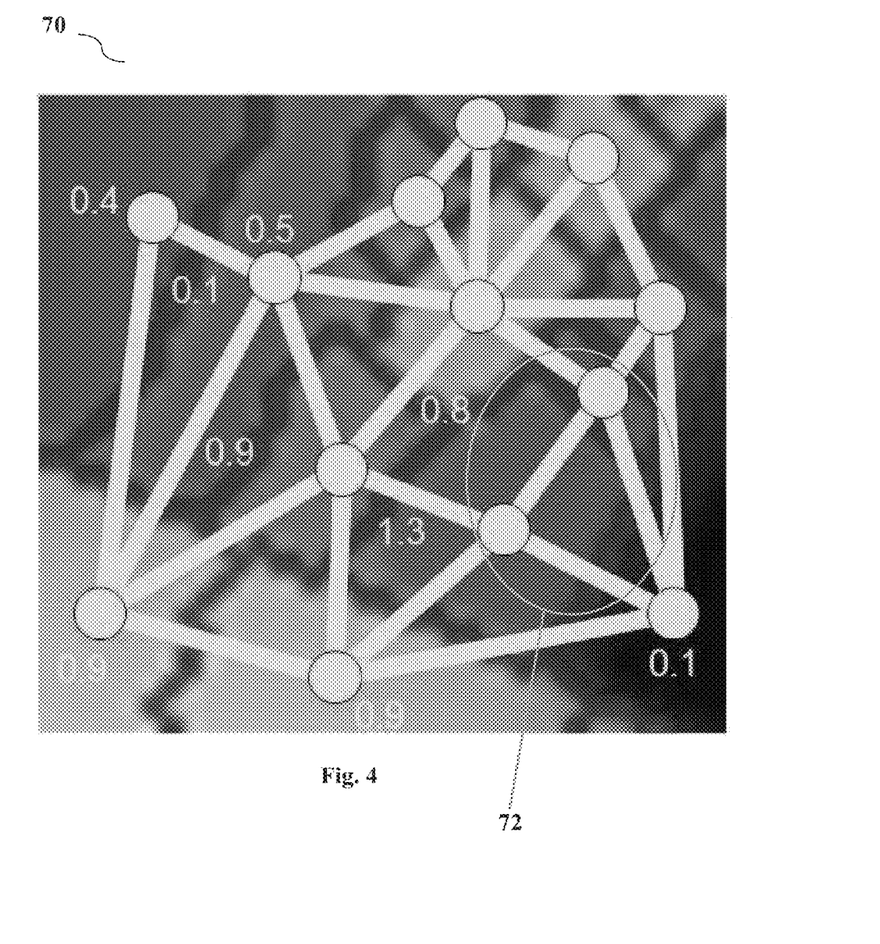
FIG. 4 illustrates an image where regions with peaks are assigned to integer x/y coordinates of crystals.

The identification processor 42 further includes an adjacency graph generator 48. The adjacency graph generator 48 creates one graph vertex for each region and links candidate regions that share a common watershed line with a graph edge. With reference to FIG. 3, the adjacency graph generator 48 generates an adjacency graph 70 as illustrated in FIG. 4 in parallel with an assignability measure. The adjacency graph includes representations of candidate regions 62, 64 and the edges link neighboring candidate regions that share a common watershed line for the flood image 30. An exploded view of an adjacency graph 60 shows linked candidate regions 70 across common watershed lines.

The identification processor 42 calculates an assignability measure that scores high for regions with intense peaks and with low separating intensities from their neighbors.

The identification processor 42 assigns candidate regions to either background 64 or a crystal 62. Regions with an average or maximum intensity below a certain threshold are assigned to the background 64, also regions that are adjacent to the image boundary where local intensity maxima are determined as noise structures.

The identification processor 42 searches for an optimal assignment of the remaining relevant crystal region candidates to individual crystals over all possible assignments. The optimal assignment, in one embodiment, is an iterative heuristic search procedure based on defined optimality criterion. The criterion includes the assignment of at least one region to each of the crystals, and an assignment that creates a more regular and smoother distribution of crystal grid positions over the image. The smoothness may be locally calculated from relative deviations of neighboring regions from the x/y axis or with respect to a parameterized global function, of which the parameters are refined with the increasing number of assigned regions.

The criterion uses further criterion such as a positive weight that gives a preference for peaks with high intensities to be included in a grid region, a negative weight for regions with low peak intensity, a negative weight for regions far off the estimated crystal grid locations, a weight or rule that allows an assignment of more than one region to one crystal if both regions are located near an estimated hexagonal boundary from the over-lattice of PMT locations, a weight or rule that allows an assignment of more than one crystal to a region if the peak density is high and/or the region is located at the upper or lower grid boundary, and an option for assigning regions with too low weights to background rather than a crystal area, and the like.

Figure 5:
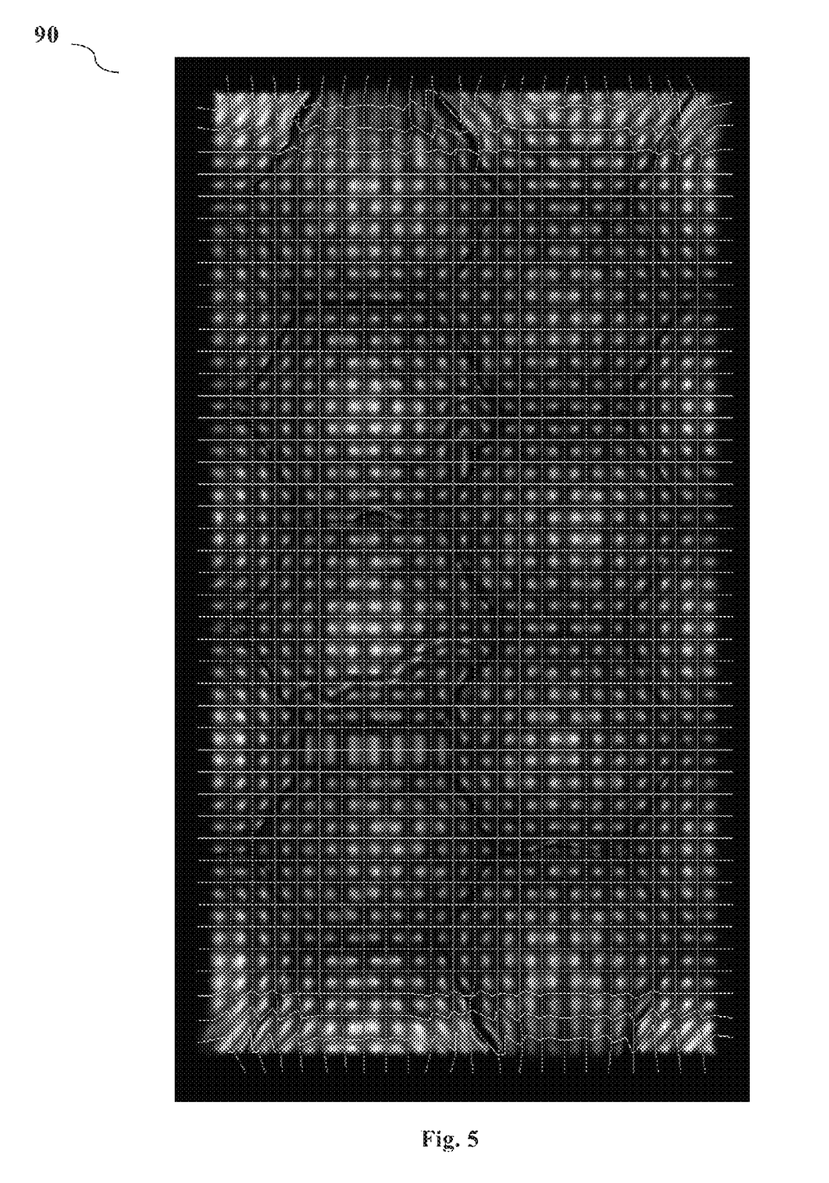
FIG. 5 illustrates a flood image mapped to a rectangular grid after all regions with peaks have been assigned to integer crystal coordinates.

With reference to FIG. 5, the calibration processor 44 transforms the assigned candidate regions to a rectangular grid 90. In one embodiment, the calibration processor 44 transforms the candidate regions by using intersections of region boundaries as control points of e.g. a bi-linear or spline-based transformation, where region boundaries may have been smoothed. Another embodiment transforms the candidate regions by determining a grid on the region intensity peaks and defining the region boundaries as mid-lines between these grid points as in a Voronoi diagram. In one embodiment, the smoothness of the transform is another optimality criterion for assigning crystals and is included in a feedback loop.

In one embodiment, the crystal identification processor 40 identifies peaks by identifying the image location corresponding to each individual scintillator crystal. The crystal identification processor 42 partitions the flood image 30 into a plurality of regions, each region being masked to correspond to one of an array of nuclear detectors. The identification processor 42 determines an initial location, i.e. row and column, for each peak 32 which is corrected to the actual scintillator crystal or template aperture location using a template matching technique, a Gaussian surface fitting technique, and a point-wise correction. A model image is generated in which the at least one Gaussian models represents the identified peaks. Misidentified peaks in the model image in which locations of the peaks in the flood image 30 differ from the corresponding scintillator crystal are determined and the locations of the misidentified peaks in the flood image 30 are corrected. From the corrected locations of each scintillator peak, a boundary map is generated which identifies the boundary for each scintillator crystal and is used to remove geometric distortions by the calibration processor 44.

Figure 6:
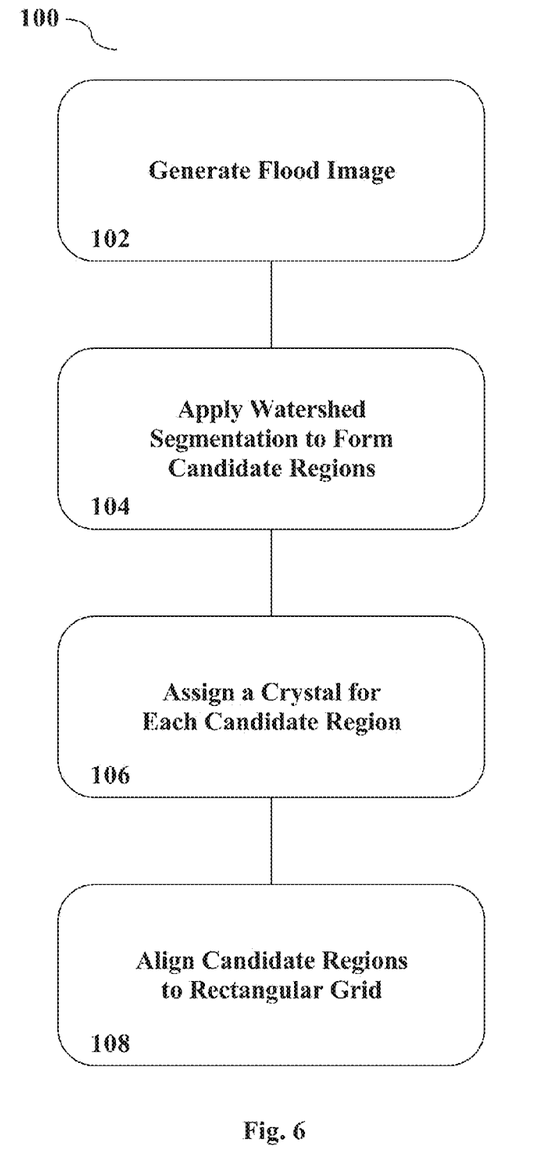
FIG. 6 depicts a method for mapping a flood image to a rectangular grid using a watershed transform.

With reference to FIG. 6, at a step 102, the initial flood image 30 is generated by the nuclear imaging system and stored in the memory 24. At a step 104, the crystal identification system accesses the flood image 30 stored in the memory 24, and performs a watershed transform using the identification processor 42 to form the tessalated flood image 60. At a step 106, a crystal for each candidate region 62 is assigned by the identification processor 42. At a step 108, the candidate regions 62 are aligned to the rectangular grid 90.

Figure 7:
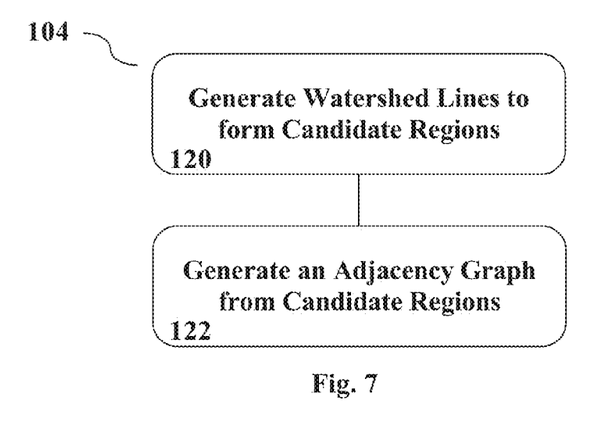
FIG. 7 depicts a method for segmenting a flood image into candidate regions and generating an adjacency graph using a watershed algorithm.

With reference to FIG. 7, a method to perform a watershed transform 104 is depicted. At a step 120, watershed lines are generated along low intensities and around local maxima of the flood image 30 by the watershed segmentator 46. At a step 122, regions with common watershed lines are linked by an adjacency graph generator 48 to form the adjacency graph 70 having the candidate regions 62.

Figure 8:
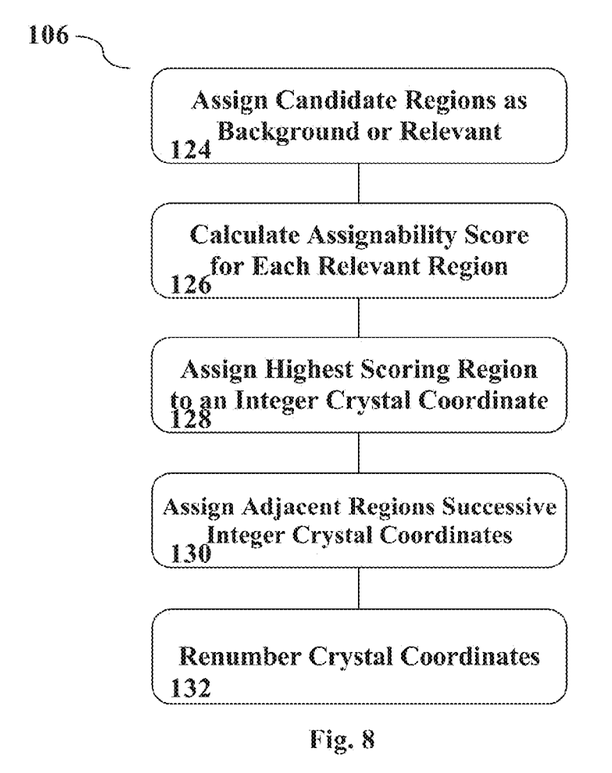
FIG. 8 depicts a method for assigning crystals to a candidate region.
Figure 9:
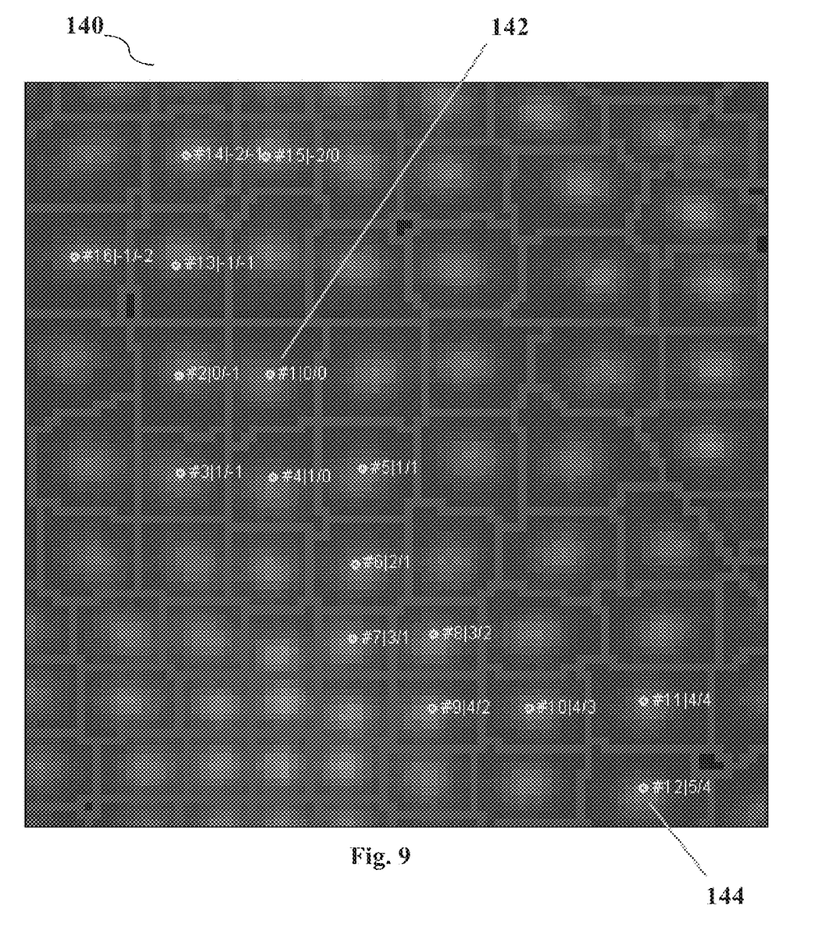
FIG. 9 illustrates an image with peaks having renumbered x/y coordinates.

With reference to FIG. 8, a detailed method to assign crystals to candidate regions is depicted. At a step 124, candidate regions are assigned as background 64 or relevant 62 by the identification processor 42. At a step 126, an assignability score is calculated for relevant candidate regions by the identification processor 42. The assignability score is high for regions with peaks 32 of high intensity and for regions with low separating intensities from neighboring candidate regions. At a step 128, with reference to FIG. 9, the candidate region with the highest assignability score is assigned to an initial crystal grid coordinate 142. FIG. 9 shows an exploded view 140 of candidate regions after initial assignment of grid coordinates. The integer crystal grid coordinates 142 & 144 apply initial unique identifiers to assign the distinct peak 32 within the candidate region to a crystal.

At a step 130, the candidate regions adjacent to the candidate region with the highest score are assigned according to an objective function. The adjacent regions are assigned in order of decreasing assignability scores, such that for all possible assignments, the optimal assignment is selected according to the objective function. For all newly assigned regions step 130 is repeated.

In one embodiment, for locally adjacent regions with very low assignability scores, alternative combinations of region-to-crystal assignments are considered and the optimal combination is selected according to the objective function.

Figure 10:
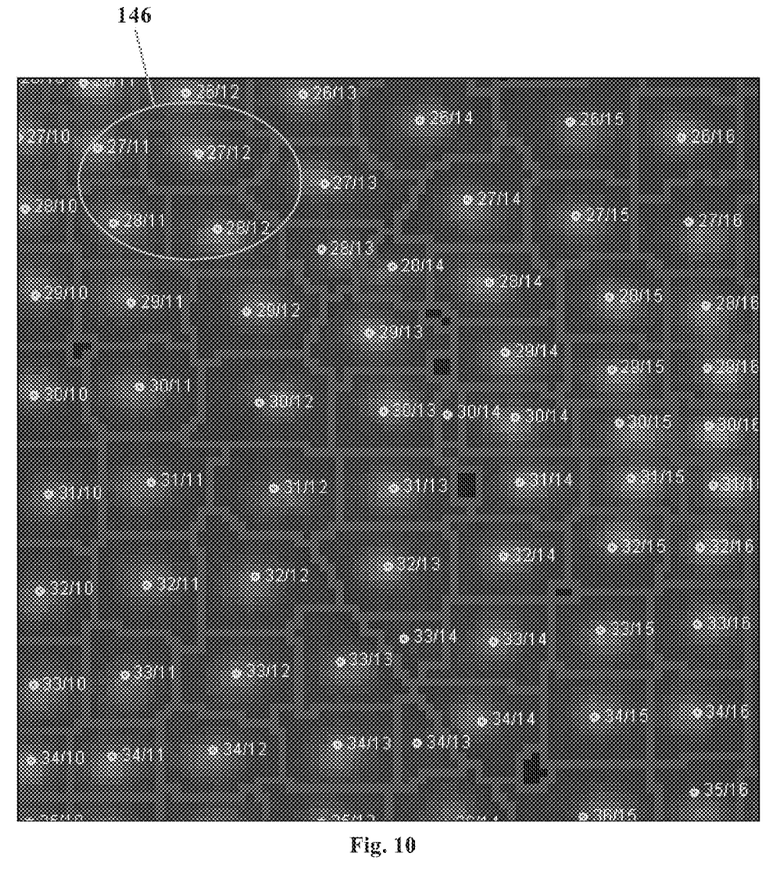
FIG. 10 illustrates an ordered renumbering of peak x/y coordinates in assigned regions.

With reference to FIG. 10, at a step 132, peak x/y coordinates of the assigned regions are renumbered 146 in order. The renumbering 132 starts with the upper left-most corner of the region grid and iterates the x-coordinates sequentially along a horizontal row and the y-coordinates along a vertical column.

It is appreciated the processes described in FIGS. 6-10 are performed by one or more processors and the results of the method are then stored on the memory 24 and displayed to the user on the graphical user interface 26 for review and potential adjustment of the calibration. It is further appreciated that instructions to perform the described processes reside, in one embodiment, in software stored on a computer readable medium.

The methods, and system according to the present application are not only applicable to peak identification in calibration of a nuclear imaging system, but e.g. as well in other systems or environments which are subject when providing patient care.

Although the system and method of the present disclosure have been described with reference to exemplary embodiments thereof, the present disclosure is not limited to such exemplary embodiments. Rather, the system and method disclosed herein are susceptible to a variety of modifications, enhancements and/or variations, without departing from the spirit or scope hereof. Accordingly, the present disclosure embodies and encompasses such modifications, enhancements and/or variations within the scope of the claims appended hereto.

The invention claimed is:

1. A method for crystal identification in nuclear imaging systems, comprising:
   generating a flood image which includes a plurality of peaks, each peak responsive to received radiation and corresponding to a scintillator crystal;
   identifying candidate regions in the flood image with a watershed segmentator implementing a watershed transform;
   assigning crystal for each candidate region; and,
   aligning the identified candidate regions of the flood image according to a rectangular grid.

2. The method according to claim 1, wherein the identifying step includes:
   generating watershed lines according to minima within the flood image to form candidate regions; and
   generating an adjacency graph with an adjacency graph generator to link the candidate regions within the flood image.

3. The method according to claim 1, wherein the assigning step includes:
   assigning candidate regions with an intensity below a defined threshold as a background region.

4. The method according to claim 3, wherein the assigning step includes:
   assigning non-background candidate regions to individual crystals.

5. The method according to claim 3, wherein the assigning step includes:
   calculating an assignability score for each region;
   selecting the highest assignability scored region;
   assigning the selected region to a grid location with crystal coordinates; and
   assigning adjacent regions according to a selected objective function.

6. The method according to claim 5, wherein the assigning step includes:
   for regions with low assignability score, selecting a combination of crystal coordinates according to the objective function.

7. The method according to claim 3, wherein the assigning step includes:
   renumbering the crystal coordinates.

8. A non-transitory computer readable medium carrying software for controlling one or more processors to perform the method of claim 1.

9. A crystal identification system, comprising:
   an image memory which receives a flood image which includes a plurality of peaks, each peak responsive to radiation detected by a corresponding scintillator crystal;
   a crystal identification processor configured to:
      identify candidate regions with an identification processor implementing a watershed transform;
      assign a crystal for each candidate region;
      align the candidate regions according to a rectangular grid for the flood image.

10. The crystal identification system according to claim 9, wherein the crystal identification processor is further programmed to identify the candidate regions by:
   generating watershed lines with a watershed segmentator according to minima within the flood image; and
   generating an adjacency graph with an adjacency graph generator to link the candidate regions within the flood image.

11. The crystal identification system according to claim 9, wherein the crystal identification processor is further programmed to assign the candidate regions by:
   assigning candidate regions having an intensity below a defined threshold as a background region.

12. The crystal identification system according to claim 11, wherein the crystal identification processor is further programmed to assign the candidate regions by:
   assigning non-background candidate regions to individual crystals.

13. The crystal identification system according to claim 12, wherein the crystal identification processor is further programmed to assign the candidate regions by:
   calculating an assignability score for each region;
   selecting the highest assignability scored region;
   assigning the selected region to a grid location with crystal coordinates; and
   assigning adjacent regions according to a selected objective function.

14. The crystal identification system according to claim 13, wherein the crystal identification processor is further programmed to assign the candidate regions by:
   renumbering the crystal coordinates.

15. The crystal identification system according to claim 12, wherein the crystal identification processor is further programmed to assign the candidate regions by:
  for regions with a low assignability score, selecting an optimal combination according to the objective function.

16. An apparatus for crystal identification in nuclear imaging systems with a crystal identification processor configured to:
  generate a flood image;
  generating watershed lines along local intensity minima within the flood image to create candidate regions;
  partition the flood image into a plurality of candidate regions;
  identify maxima within each candidate region;
  assign the candidate regions to corresponding crystals; and
  assign the identified maxima to a crystal having crystal coordinates.

17. The apparatus according to claim 16, the crystal identification processor further configured to:
  segment the flood image into candidate regions using a watershed algorithm;
  generate an adjacency graph to link candidate regions);
  locate a peak within each candidate region;
  label each peak with x/y coordinates according to an assignability score and a defined optimality objective function;
  map the adjacency graph to a rectangular template with a calibration processor; and
  display the mapped adjacency graph to a user via a graphical user interface.

* * * * *